United States Patent
Krausz et al.

(10) Patent No.: US 11,592,848 B2
(45) Date of Patent: Feb. 28, 2023

(54) PRESSURE CONTROLLER

(71) Applicant: BUERKERT WERKE GMBH & CO. KG, Ingelfingen (DE)

(72) Inventors: Alyse Krausz, Ingelfingen (DE); Christoph Scholl, Ingelfingen (DE); Jonas Mueller, Ingelfingen (DE); Matthias Boehringer, Ingelfingen (DE); Thomas Hahn, Ingelfingen (DE)

(73) Assignee: BUERKERT WERKE GMBH & CO. KG

( * ) Notice: Subject to any disclaimer, the term of this patent is extended or adjusted under 35 U.S.C. 154(b) by 403 days.

(21) Appl. No.: 16/814,096

(22) Filed: Mar. 10, 2020

(65) Prior Publication Data
US 2020/0293070 A1    Sep. 17, 2020

(30) Foreign Application Priority Data

Mar. 15, 2019 (DE) ...................... 10 2019 106 682.4

(51) Int. Cl.
*G05D 7/06* (2006.01)
*G05D 16/20* (2006.01)

(52) U.S. Cl.
CPC ....... *G05D 7/0629* (2013.01); *G05D 16/2053* (2013.01); *Y10T 137/2544* (2015.04); *Y10T 137/87169* (2015.04)

(58) Field of Classification Search
CPC ...... Y10T 137/2544; Y10T 137/87169; G05D 16/2053; G05D 7/0629
USPC .................................................. 137/102, 596
See application file for complete search history.

(56) References Cited

U.S. PATENT DOCUMENTS

| 2,474,122 | A | * | 6/1949 | Schneck | G05D 16/166 137/115.18 |
| 3,086,542 | A | * | 4/1963 | Mosier | F15B 11/06 91/447 |
| 3,272,218 | A | * | 9/1966 | Johnson | F16K 31/36 137/625.25 |
| 3,654,835 | A | * | 4/1972 | Sievenpiper | F15B 11/024 137/115.06 |
| 4,253,480 | A | * | 3/1981 | Kessel | G05D 16/2053 137/487.5 |
| 4,592,382 | A | * | 6/1986 | Rubin | E03C 1/104 137/218 |
| 4,699,175 | A | * | 10/1987 | Anderson | G05D 16/185 137/625.5 |
| 9,707,371 | B2 | * | 7/2017 | Callaghan | A61M 16/208 |
| 10,410,840 | B2 | * | 9/2019 | Mizutani | H01J 37/32449 |

(Continued)

FOREIGN PATENT DOCUMENTS

CN    201836488    5/2011 ............. F16K 17/36

*Primary Examiner* — William M McCalister
(74) *Attorney, Agent, or Firm* — Hayes Soloway P.C.

(57) ABSTRACT

In a pressure controller for adjusting a pressure in a container connected downstream of the pressure controller and in fluid communication therewith, the pressure controller includes a main fluid duct having a fluid input and a fluid output leading to the container and a control valve for adjusting a fluid pressure at the fluid output, a bypass duct branching off from the main fluid duct downstream of the control valve, configured for venting of the main fluid duct, and a flow cross-section of the bypass duct being smaller than a maximum flow cross-section of the main fluid duct.

9 Claims, 6 Drawing Sheets

(56) References Cited

U.S. PATENT DOCUMENTS

| | | | |
|---|---|---|---|
| 2003/0010398 A1* | 1/2003 | Tanaka | B67C 3/007 |
| | | | 141/94 |
| 2003/0168101 A1* | 9/2003 | Sulatisky | F02D 19/022 |
| | | | 137/487.5 |
| 2010/0012027 A1* | 1/2010 | Poignant | C23C 16/4486 |
| | | | 118/692 |
| 2013/0092259 A1* | 4/2013 | Griffin, Jr. | F15B 11/08 |
| | | | 137/485 |
| 2015/0268669 A1* | 9/2015 | Vogt | G05D 16/2095 |
| | | | 137/486 |
| 2016/0195196 A1* | 7/2016 | Ringer | A62C 35/68 |
| | | | 169/19 |
| 2017/0083030 A1* | 3/2017 | Groves | G05D 16/2053 |
| 2020/0293070 A1* | 9/2020 | Krausz | G05D 7/0676 |

* cited by examiner

A-A (1:1)

PRESSURE CONTROLLER

BACKGROUND OF THE INVENTION

The invention relates to a pressure controller for adjusting a pressure in a container connected downstream of the pressure controller and in fluid communication therewith.

Controlling a pressure in a container is of importance, for example, in pressure-time controlled dosing processes.

In pressure-time controlled dosing processes, a defined pressure is applied to a container containing a liquid to be dosed. Utilizing the opening period of a dosing valve, a quantity of liquid is dosed accordingly in a time-dependent manner. A dosing of this type is used, for example, in in-vitro diagnostics or in pipetting robots. Liquids are primarily dosed here, but the dosing of gases is also conceivable.

The accuracy of the quantity dosed from a pressurized container here depends on the pressure prevailing in the container, the temperature or, respectively, the temperature-dependent viscosity of a liquid, and the opening period of the dosing valve.

To ensure a precise pressure control in small containers, it is necessary to react to changes as quickly as possible by a variable outflow from the container filled with liquid. As a rule, reagents used for in-vitro diagnostics are stored in containers made of glass or a plastic material with container volumes of 1.5 ml to 2 ml. The container is usually only filled to a level such that a cushion of air of at least 0.5 ml still exists in the container.

The challenge consists in keeping the pressure in the container constant, for example at 35 mbar. As soon as the dosing valve is opened and liquid flows out of the container, the pressure needs to be readjusted. In the case of small volumes, readjustment quickly leads to overshooting or undershooting, i.e. to pressure fluctuations, in particular in the range of +/− 4 mbar.

It is therefore an object of the present invention to provide a pressure controller by means of which a pressure in a container can be controlled particularly precisely.

SUMMARY OF THE INVENTION

This object is achieved in accordance with the invention by a pressure controller for adjusting a pressure in a container connected downstream of the pressure controller and in fluid communication therewith, the pressure controller including a main fluid duct having a fluid input and a fluid output leading to the container and a control valve for adjusting a fluid pressure at the fluid output, a bypass duct branching off from the main fluid duct downstream of the control valve, by means of which a venting of the main fluid duct can be realized, and a flow cross-section of the bypass duct being smaller than a maximum flow cross-section of the main fluid duct.

The maximum flow cross-section of the main fluid duct is the flow cross-section when the control valve is open to the maximum.

Providing a bypass duct allows a continuous outflow of compressed air from the main fluid duct. This reduces tolerances and pressure fluctuations when controlling a pressure in a container connected downstream of the pressure controller. In this way, a pressure-time controlled dosing process can be particularly precise.

The fact that the flow cross-section of the bypass duct is smaller than the maximum flow cross-section of the main fluid duct ensures that a sufficient fluid pressure can be built up at the fluid output. In fact, this allows a larger quantity of a fluid to be supplied to the main fluid duct than can flow out through the bypass duct.

The fluid is air or a different gas, for example.

Venting is realized in particular in that the bypass duct leads to an outer wall of the pressure controller and opens into an environment of the pressure controller.

In the simplest case, the bypass duct is implemented in particular by a drilled bypass hole.

The maximum flow cross-section of the bypass duct is, for example, between 0.1% and 10% of the maximum flow cross-section of the main fluid duct. This allows a sufficiently fast pressure build-up. A bypass duct having such a flow cross-section allows pressure fluctuations of less than 0.5 bar to be achieved in a container connected downstream of the pressure controller.

According to one embodiment, the pressure controller includes an electromagnetically actuatable vent valve, the flow cross-section of the bypass duct being adjustable by means of the vent valve. In this way, the flow cross-section of the bypass duct can be adjusted as a function of an opening state of the control valve and/or a position of a dosing valve, by means of which a fluid outflow from the pressurized container can be controlled. In particular, a less of a fluid flowing through the main fluid duct can thereby be minimized in that, for example, the bypass duct can be closed by the vent valve when no pressure control is carried out. In other words, the bypass duct can only be in the open state by means of the vent valve when a pressure control or a dosing is performed.

In particular, the vent valve is a further control valve.

If both the control valve is in an open state and the vent valve is in a slightly open state, it is possible to react particularly quickly to pressure fluctuations in the container. In fact, when the vent valve is already in a slightly open state, a transition to a less open or a more open state can be effected in just a few milliseconds, in particular in less than 5 milliseconds. For a transition from a closed position to an open position, however, toe vent valve needs at least 20 milliseconds.

The pressure controller comprises, for example, a microcontroller by means of which the vent valve can be controlled. As an alternative, the vent valve may be controlled by means of a superordinate system.

According to one embodiment, the pressure controller includes a control unit for controlling the control valve and which is configured to adjust an output pressure at the fluid output to a desired value by appropriately controlling the control valve. This allows an output pressure to be controlled particularly accurately.

The pressure controller preferably comprises a pressure sensor which is arranged downstream of the control valve and is in fluid communication with the main fluid duct to measure an actual pressure in the main fluid duct downstream of the control valve. This allows an actual pressure in the main fluid duct to be monitored by means of the pressure sensor.

Preferably, the control unit is configured to transmit an actual pressure measured by the pressure sensor to the control valve as an input signal. The pressure controller can thus control a pressure in the main fluid duct or at the fluid output with particular precision. In this way, the accuracy of a pressure-time controlled dosing carried out from a container connected downstream is particularly high.

The pressure controller may include a carrier plate in which the main fluid duct extends, and a housing cover placed on the carrier plate, the housing cover together with the carrier plate defining an electronics chamber of the pressure controller. The pressure controller can thus constitute a closed unit, in particular a "plug-and-play" device.

The housing cover has, for example, electrical interfaces of the pressure controller arranged thereon, in particular a bus connection and an analog input.

The control valve, the vent valve, the pressure sensor and/or an electronics module may be arranged on the carrier plate. As a result, the pressure controller can be of a particularly compact design.

According to one embodiment, the pressure controller is formed as a piping-free system. This makes the pressure controller particularly sturdy. This means that the main fluid duct in the pressure controller does not have a pipe, but is a duct in a part, especially a block. Also, there is no pipe leading to the bypass duct or to the control valve. The bypass duct itself is also not a pipe. All of the ducts are preferably formed in a one-piece part, e.g. a plate or more generally a block.

The vent valve may be formed as a control valve, that is, a special type of continuous valve.

BRIEF DESCRIPTION OF THE DRAWINGS

Further advantages and features of the invention will be apparent from the description below and from the accompanying drawings, to which reference is made and in which.

DETAILED DESCRIPTION OF THE INVENTION

Figure 1:
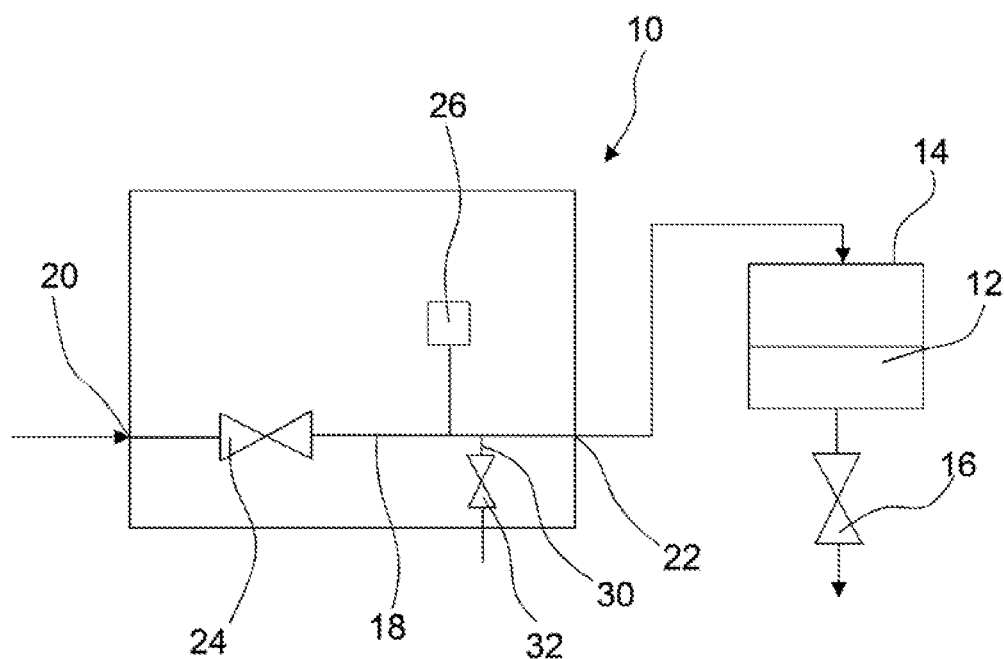
FIG. 1 schematically shows a pressure controller according to the invention, to which a container is connected.

FIG. 1 schematically illustrates a pressure controller 10 according to the invention, which is connected to a container 14 containing a liquid 12. The holding capacity of the container 14 is between 0.1 ml and 5 ml, for example. Instead of a liquid 12, the container 14 may also contain a gas to be dosed.

The pressure controller 10 is in particular suitable for controlling a pressure in the container 14 so that a defined pressure exists in the container 14 at all times. In this way, the liquid 12 from the container 14 can be dosed in a pressure-time controlled manner. In doing so, a valve 16 connected downstream of the container 14, in particular a dosing valve, is opened for a defined period of time.

If the pressure in the container 14 is always constant, the same amount of liquid always flows out of the container 14 when the valve 16 is opened for a defined period of time.

The pressure controller 10 comprises a main fluid duct 18 having a fluid input 20 and a fluid output 22 leading to the connected container 14.

An uncontrolled primary pressure is applied to the fluid input 20. The pressure controller 10 comprises a control valve 24 in order to adjust a defined pressure at the fluid output 22 and thus also in the container 14.

The compressed air present at the fluid output 22 is applied, for example, as a pressure cushion to the container 14, from which small quantities of liquid can be dosed in a very precise and time-controlled manner using the valve 16.

Furthermore, a pressure sensor 26 is provided, which is arranged downstream of the control valve 24.

The pressure sensor 26 is in fluid communication with the main fluid duct 18 to measure an actual pressure in the main fluid duct 18 downstream of the control valve 24.

A bypass duct 30 branches off from the main fluid duct 18 downstream of the control valve 24, in particular downstream of the pressure sensor 26. A venting of the main fluid duct 18 can be realized by means of the bypass duct 30, i.e. part of the fluid flowing through the main fluid duct 18 can flow out of the pressure controller 10 via the bypass duct 30.

Here, a flow cross-section of the bypass duct 30 is smaller than a maximum flow cross-section of the main fluid duct 18. In this way, a reliable pressure build-up in the main fluid duct 18 is possible.

The maximum flow cross-section of the bypass duct 30 is, for example, between 0.1% and 10% of the maximum flow cross-section of the main fluid duct 18.

In one embodiment, the bypass duct 30 may be permanently open, so that a continuous outflow of fluid from the main fluid duct 18 is possible.

In a further embodiment, which is illustrated in the Figures, an electromagnetically actuatable vent valve 32 is provided, which is in the form of a control valve, the flow cross-section of the bypass duct 30 being adjustable by means of the vent valve 32. In particular, the flow cross-section of the bypass duct 30 can be adjusted to a value of up to 10% of the maximum flow cross-section of the main fluid duct 18 by means of the vent valve 32.

When no pressure control fakes place, the bypass duct 30 can be closed by means of the vent valve 32. This allows pressure losses to be minimized. During pressure control, however, the bypass duct 30 is continuously open.

Figure 2:
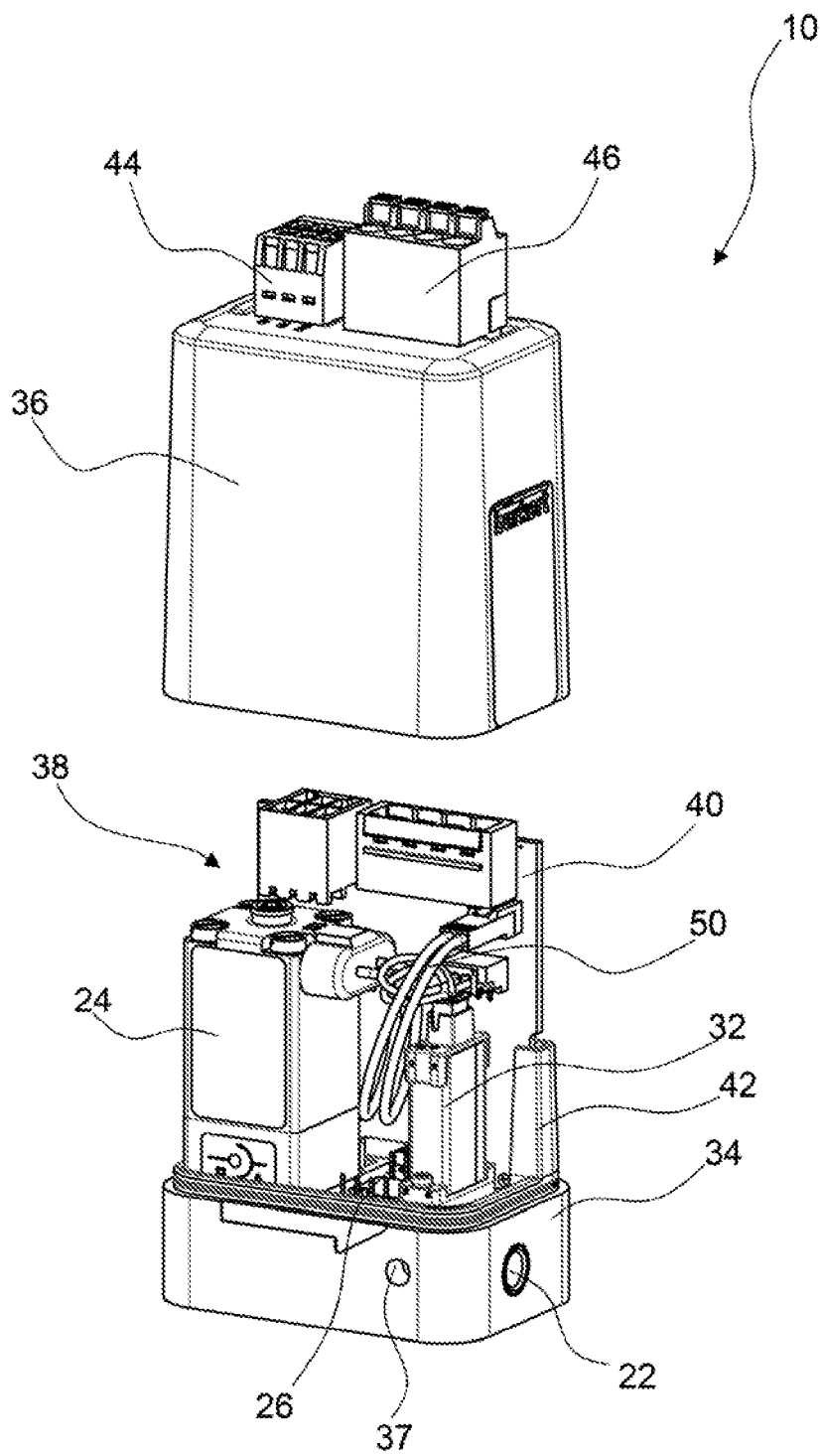
FIG. 2 shows an exploded illustration of a pressure controller according to the invention.

FIG. 2 shows an exploded illustration of the pressure controller 10.

FIG. 2 shows that the pressure controller 10 includes a carrier plate 34 and a housing cover 36 placed on the carrier plate 34. The housing cover 36 may be clamped to the carrier plate 34 here.

The main fluid duct 18 extends inside the carrier plate 34; only the fluid output 22 of the main fluid duct 18 can be seen in FIG. 2.

FIG. 2 further illustrates a vent hole 37, which in particular is arranged on an outer wall of the carrier plate 34. The bypass duct 30 opens into an environment of the pressure controller 10 via the vent hole 37.

The housing cover 36 together with the carrier plate 34 defines an electronics chamber 38 of the pressure controller 10.

The control valve 24, the vent valve 32 and the pressure sensor 26 are arranged on the carrier plate 34. For example, they are screwed or bolted to the carrier plate 34. The pressure sensor 26 here is arranged on a circuit board.

The pressure controller 10 furthermore comprises an electronics module 40, which is also arranged on the carrier plate 34. The electronics module 40 is a printed circuit board, for example.

The control valve 24, the vent valve 32 and the pressure sensor 26 are connected to the electronics module 40 by means of electrical lines 50.

For retaining the electronics modulo 40, a guide 42 is provided in the carrier plate 34, in which the electronics module 40 is inserted. This allows the electronics module 40 to be mounted particularly easily. When the housing cover 36 is placed on the carrier plate 34, the electronics module 40 can no longer become detached from the guide 42. It is, however, also possible to fasten the electronics module 40 in some other way, in particular by using screws or bolts.

Electrical interfaces 44, 46 of the pressure controller 10 are arranged on the housing cover 36. The interface 44, for example, provides a bus connection for communication, for example a CanOpen interface and a 24 V supply. The interface 46 provides, for example, an analog input for an external sensor and a 12 V voltage supply for optional connection of a further device, as well as a digital output.

In order to control the pressure in the container 14, the pressure controller 10 comprises a control unit, not depicted for the sake of simplicity, for controlling the control valve 24. The control unit is configured to adjust an output pressure at the fluid output 22 to a desired value by appropriately controlling the control valve 24.

Here, the control unit may be arranged outside the electronics chamber 38 and may be connected to the pressure controller 10 via the interface 46, in particular via the bus connection. Alternatively, the control unit may be integrated in the electronics module 40.

Furthermore, the control unit is configured to transmit an actual pressure measured by the pressure sensor 26 as an input signal to the control valve 24. If the actual pressure deviates from a desired pressure, appropriate readjustment can be performed.

The pressure controller 10 is constructed as a piping-free system. This means that all fluid lines of the pressure controller 10, that is, the main fluid duct 18 and the bypass duct 30, are integrally formed in the carrier plate 34. No pipes are provided. The carrier plate 34 thus constitutes a fluidics housing of the pressure controller 10.

Figure 3:
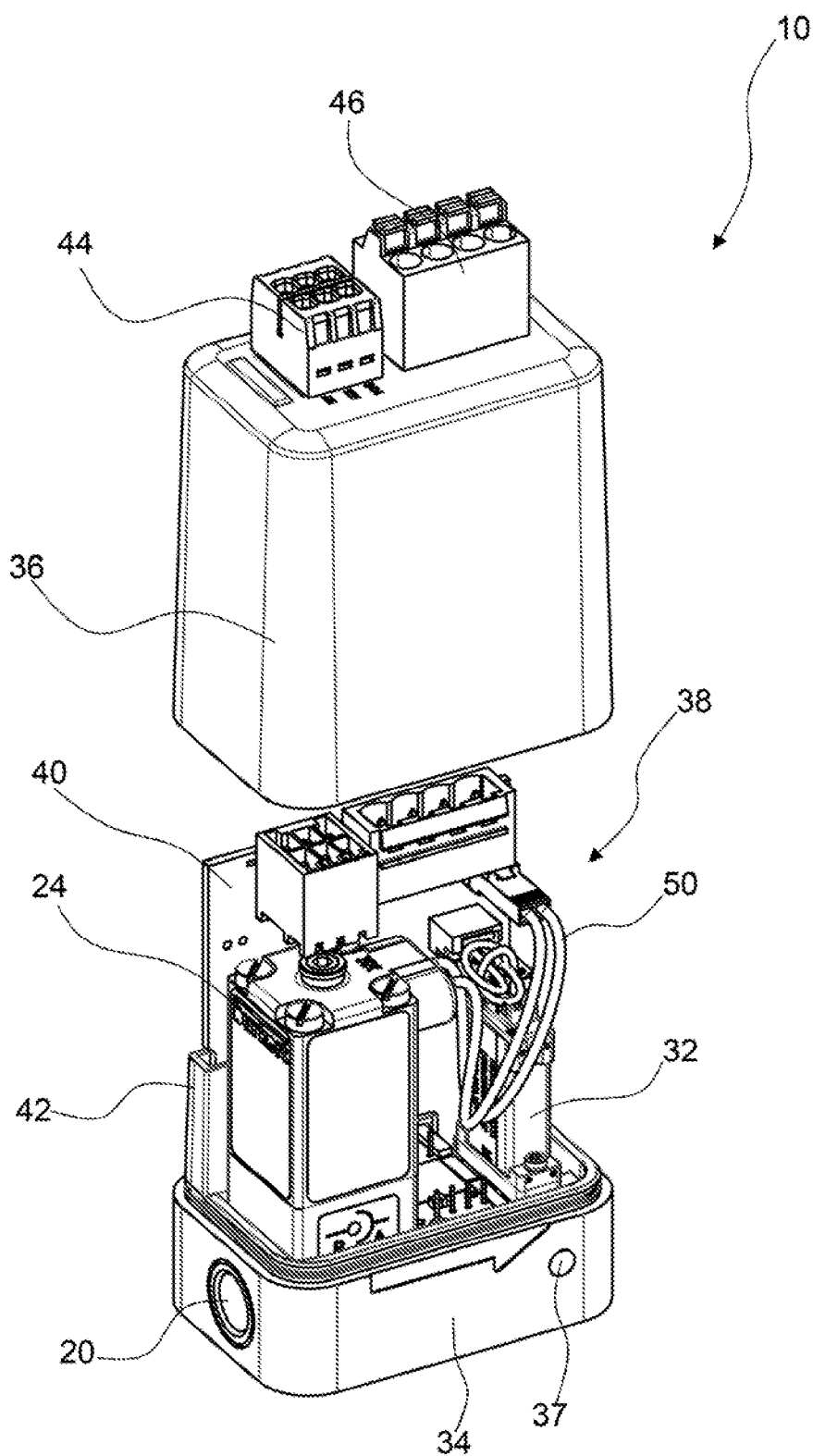
FIG. 3 shows a further exploded illustration of the pressure controller of FIG. 2.

FIG. 3 shows a further exploded view of the pressure controller 10, in which the fluid input 20 in the carrier plate 34 is visible.

Figure 4:
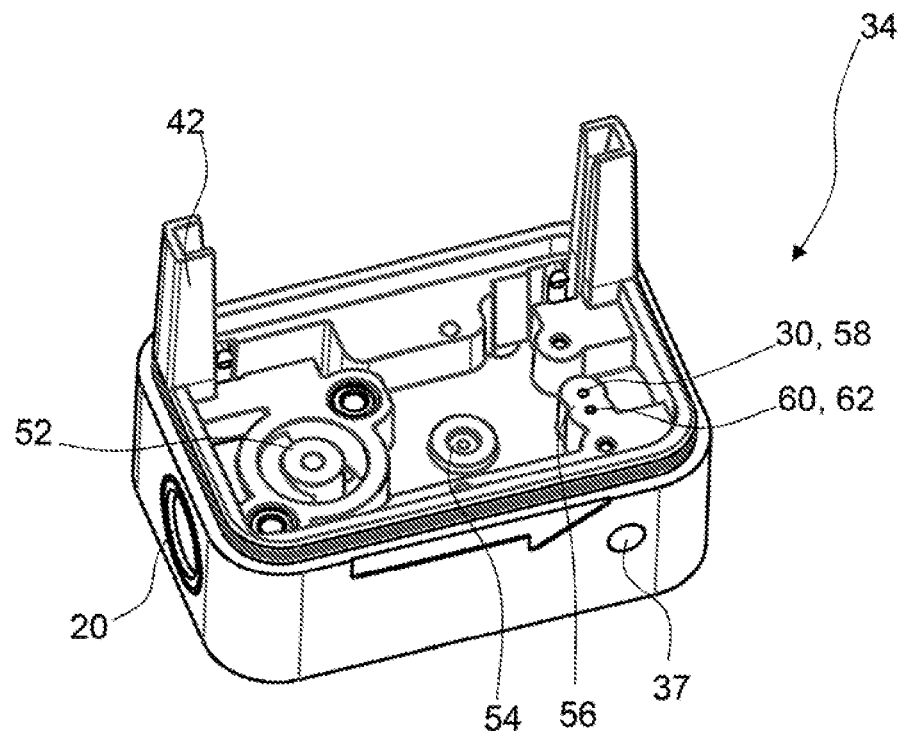
FIG. 4 shows a carrier plate of a pressure controller.

FIG. 4 shows a detail view of the carrier plate 34 of the pressure controller 10. This view shows a seat 52 for the control valve 24, a fluidic connection 54 to the pressure sensor 26, and a seat 56 for the vent valve 32.

Figure 5:
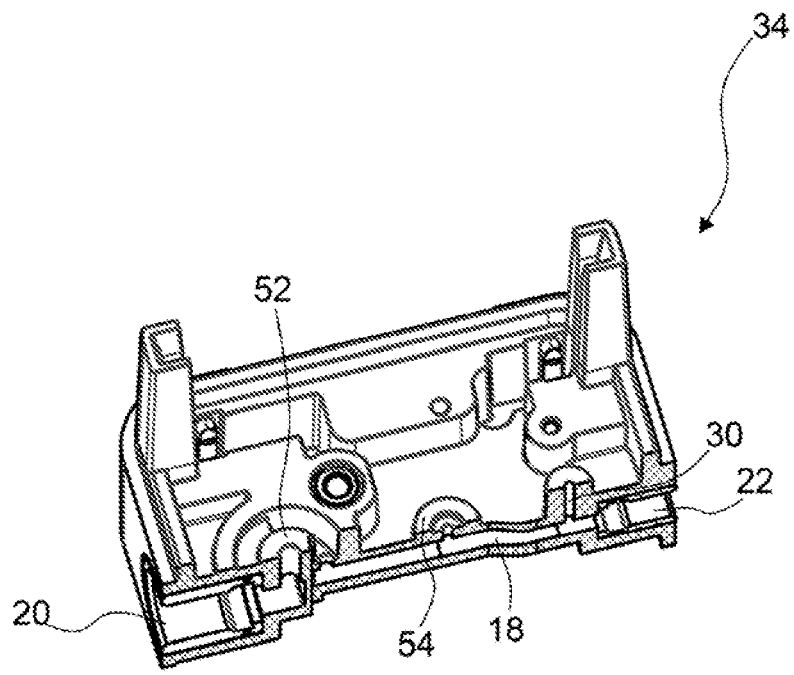
FIG. 5 shows a sectional representation of the carrier plate of FIG. 4.

It is apparent from FIGS. 4 and 5 that all fluid ducts 18, 30 as well as fluid ports 20, 22, 52, 54, 56 are integrally formed in the carrier plate 34.

The bypass duct 30, which branches off from the main fluid duct 18, opens by its outlet 58 into an input of the vent valve 32, if the vent valve 32 is mounted to the carrier plate 34.

An output of the vent valve 32 connects to an inlet 60 into a further duct section 62, which extends to the vent hole 37. The duct section 62 is associated with the bypass duct 30. In other words, the bypass duct 30 is interrupted by the vent valve 32. If no vent valve 32 is provided, the bypass duct 30 extends continuously as far as to the vent hole 37.

In addition, in FIG. 4 the fluid input 20 is visible.

FIG. 5 shows a longitudinal section taken through the carrier plate 34. In this representation the course of the main fluid duct 18 is particularly well visible.

The bypass duct 30 can also be seen in FIG. 5.

Figure 6:
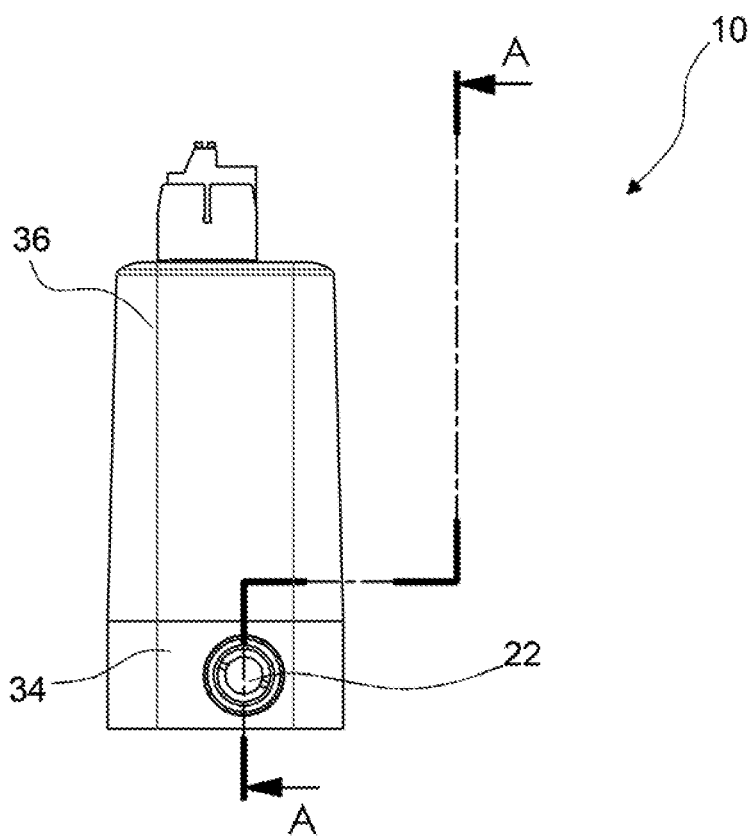
FIG. 6 shows a side view of the pressure controller of FIG. 2.

FIG. 6 shows the pressure controller 10 in a side view. The housing cover 36 is illustrated here in its position mounted to the carrier plate 34.

Figure 7:
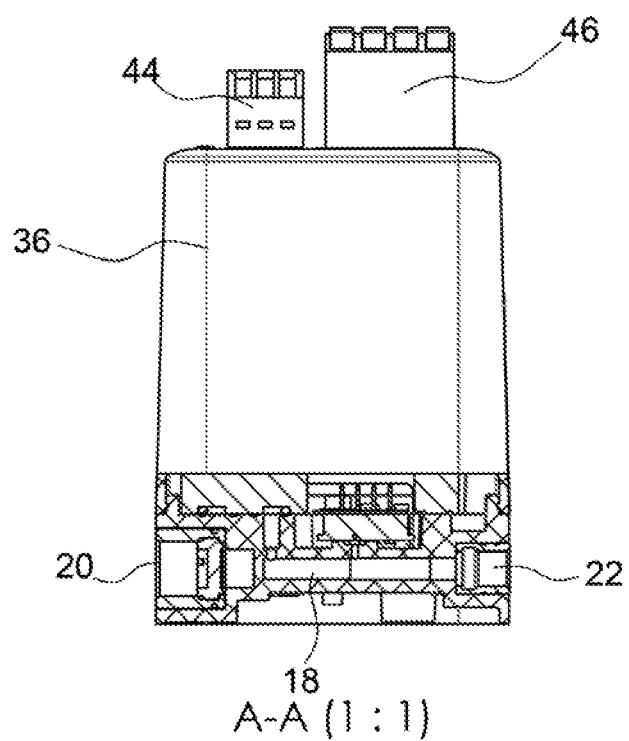
FIG. 7 shows a partial section taken through the pressure controller along line A-A in FIG. 6.

FIG. 7 shows a partial section taken through the pressure controller 10 along the line A-A in FIG. 6.

Figure 8:
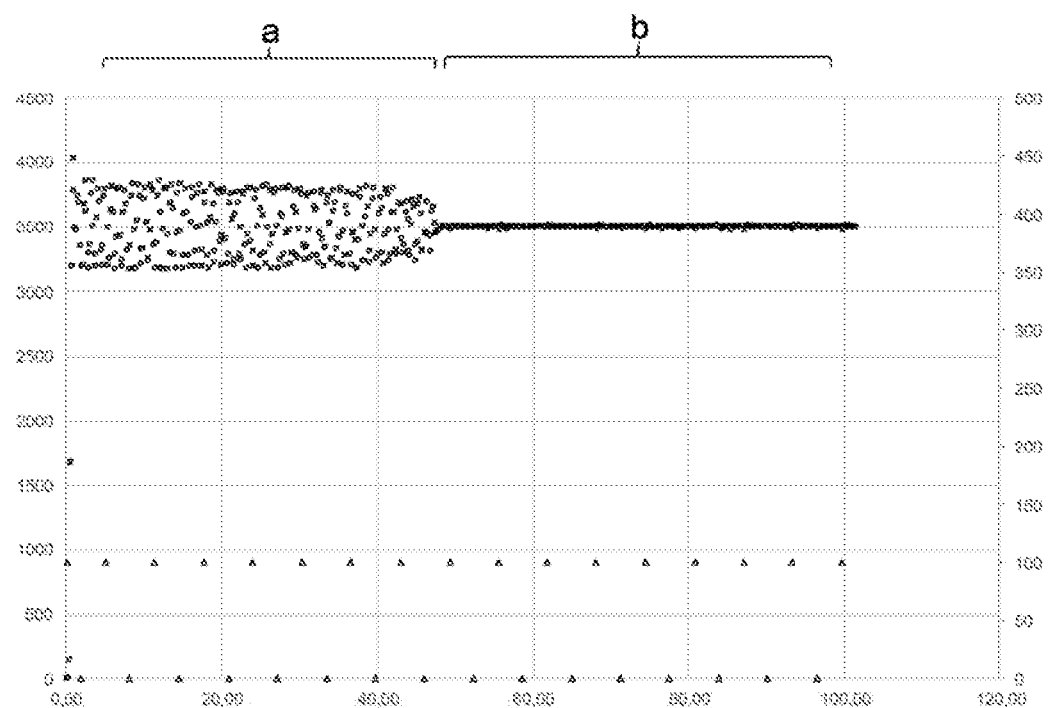
FIG. 8 shows a chart for illustrating pressure fluctuations when using a pressure controller with and without a bypass duct.

FIG. 8 shows a chart for illustrating pressure fluctuations in a container 14 by means of a pressure controller.

A pressure in Pa is plotted on a vertical axis depicted on the left in FIG. 8. The pressure values are illustrated here by means of squares.

An opening state of a valve 16 connected downstream of the container 14 is depicted on a vertical axis on the right, the valve 16 being fully closed at 0 and fully open at 100. The opening state of the valve 16 is illustrated in the chart by means of triangles.

A time in seconds is plotted on the longitudinal axis.

Pressure fluctuations when using a pressure controller as known from the prior art are illustrated in a section a.

A section b illustrates the pressure fluctuations when using a pressure controller 10 according to the invention as shown in FIGS. 1 to 7. In the illustrated example, the bypass duct 30 of the pressure controller 10 has a flow cross-section of 10% of the maximum flow cross-section of the main fluid duct 16.

It becomes clear here that when using a pressure controller 10 according to the invention having a bypass duct 30, the pressure fluctuations are significantly lower than when using a pressure controller according to the prior art without a bypass duct.

The controlled pressure in a container 14 is to amount to 3500 Pa, for example.

When the valve 16 is opened, liquid flows out of the container 14 and the pressure in the container has to be readjusted by means of the pressure controller 10. The less pressure fluctuations occur in the process, the higher a dosing accuracy can be.

When a conventional pressure controller is used, the pressure fluctuates between about 3200 Pa and 3800 Pa (see section a). When a pressure controller 10 according to the invention is used, which has a bypass duct 30, the pressure fluctuations are considerably lower and in particular are less than 50 Pa (see section b).

The invention claimed is:

1. A pressure controller and a container connected downstream of the pressure controller and in fluid communication with the pressure controller, wherein the pressure controller includes a main fluid duct having a fluid input and a fluid output leading to the container and includes a control valve for adjusting a fluid pressure at the fluid output, wherein the pressure controller further includes a bypass duct branching off from the main fluid duct downstream of the control valve, configured for venting of the main fluid duct, and wherein a maximum flow cross-section of the bypass duct is between 0.1% and 10% of a maximum flow cross-section of the main fluid duct.

2. The pressure controller and container according to claim 1, wherein the pressure controller includes an electromagnetically actuatable vent valve, the flow cross-section of the bypass duct being adjustable by the vent valve.

3. The pressure controller and container according to claim 1, wherein the pressure controller includes a control unit for controlling the control valve, the control unit being configured to adjust an output pressure at the fluid output to a desired value by appropriately controlling the control valve.

4. The pressure controller and container according to claim 1, wherein the pressure controller comprises a pressure sensor which is arranged downstream of the control valve and in fluid communication with the main fluid duct to measure an actual pressure in the main fluid duct downstream of the control valve.

5. The pressure controller and container according to claim 2, wherein the pressure controller includes a control unit for controlling the control valve, the control unit being configured to adjust an output pressure at the fluid output to a desired value by appropriately controlling the control valve.

6. The pressure controller and container according to claim 1, wherein the pressure controller includes a carrier plate in which the main fluid duct extends, and a housing cover placed on the carrier plate, the housing cover together with the carrier plate limiting an electronics chamber of the pressure controller.

7. The pressure controller and container according to claim 6, wherein the housing cover has electrical interfaces of the pressure controller arranged thereon.

8. The pressure controller and container according to claim 1, wherein the pressure controller is formed as a piping-free system.

9. The pressure controller and container according to claim 1, wherein the vent valve is formed as a control valve.

* * * * *